(12) United States Patent
Alexander, Jr.

(10) Patent No.: US 7,664,040 B2
(45) Date of Patent: Feb. 16, 2010

(54) METHOD OF ACCELERATING THE SHORTEST PATH PROBLEM

(75) Inventor: Cedell A. Alexander, Jr., Durham, NC (US)

(73) Assignee: Applied Micro Circuits Corporation, San Diego, CA (US)

( * ) Notice: Subject to any disclaimer, the term of this patent is extended or adjusted under 35 U.S.C. 154(b) by 376 days.

(21) Appl. No.: 11/670,873

(22) Filed: Feb. 2, 2007

(65) Prior Publication Data
US 2007/0177512 A1 Aug. 2, 2007

Related U.S. Application Data

(62) Division of application No. 10/404,970, filed on Mar. 31, 2003, now Pat. No. 7,457,286.

(51) Int. Cl.
*H04L 12/28* (2006.01)
(52) U.S. Cl. .................................... 370/238; 370/383
(58) Field of Classification Search ................ 370/238, 370/237, 252, 255, 231, 248, 395.32, 238.1, 370/253, 400, 363, 368, 371, 374, 378, 381
See application file for complete search history.

(56) References Cited

U.S. PATENT DOCUMENTS

| | | | |
|---|---|---|---|
| 6,011,795 A | 1/2000 | Varghese et al. | |
| 6,034,946 A * | 3/2000 | Roginsky et al. | 370/238 |
| 6,289,096 B1 | 9/2001 | Suzuki | |
| 6,356,911 B1 | 3/2002 | Shibuya | |
| 6,370,119 B1 | 4/2002 | Basso et al. | |
| 6,529,498 B1 | 3/2003 | Cheng | |
| 6,532,212 B1 * | 3/2003 | Soloway et al. | 370/230 |
| 7,047,317 B1 | 5/2006 | Huie et al. | |
| 7,457,286 B2 * | 11/2008 | Alexander, Jr. | 370/379 |
| 2002/0054572 A1 * | 5/2002 | Saleh et al. | 370/254 |

OTHER PUBLICATIONS

"Single Source Shortest Path (SSSP) Problem", http://www.cs.rochester.edu/users/faculty/nelson/courses/csc_173/graphs/sssp.html, downloaded Mar. 16, 2003, 3 pages.

* cited by examiner

*Primary Examiner*—Brenda Pham
(74) *Attorney, Agent, or Firm*—Silicon Valley Patent Group LLP

(57) ABSTRACT

The solution to the shortest path between a source node and multiple destination nodes is accelerated using a grouping of nodes, where the nodes are grouped based on distance from the source node, and a corresponding set of memory locations that indicate when a group includes one or more nodes. The memory locations can be quickly searched to determine the group that represents the shortest distance from the source node and that includes one or more nodes. Nodes may be grouped into additional groupings that do not correspond to the set of memory locations, when the distance from the source node to the nodes exceeds the range of memory locations. Advantageously, the disclosed system and method provide the ability to reach asymptotically optimal performance.

6 Claims, 8 Drawing Sheets

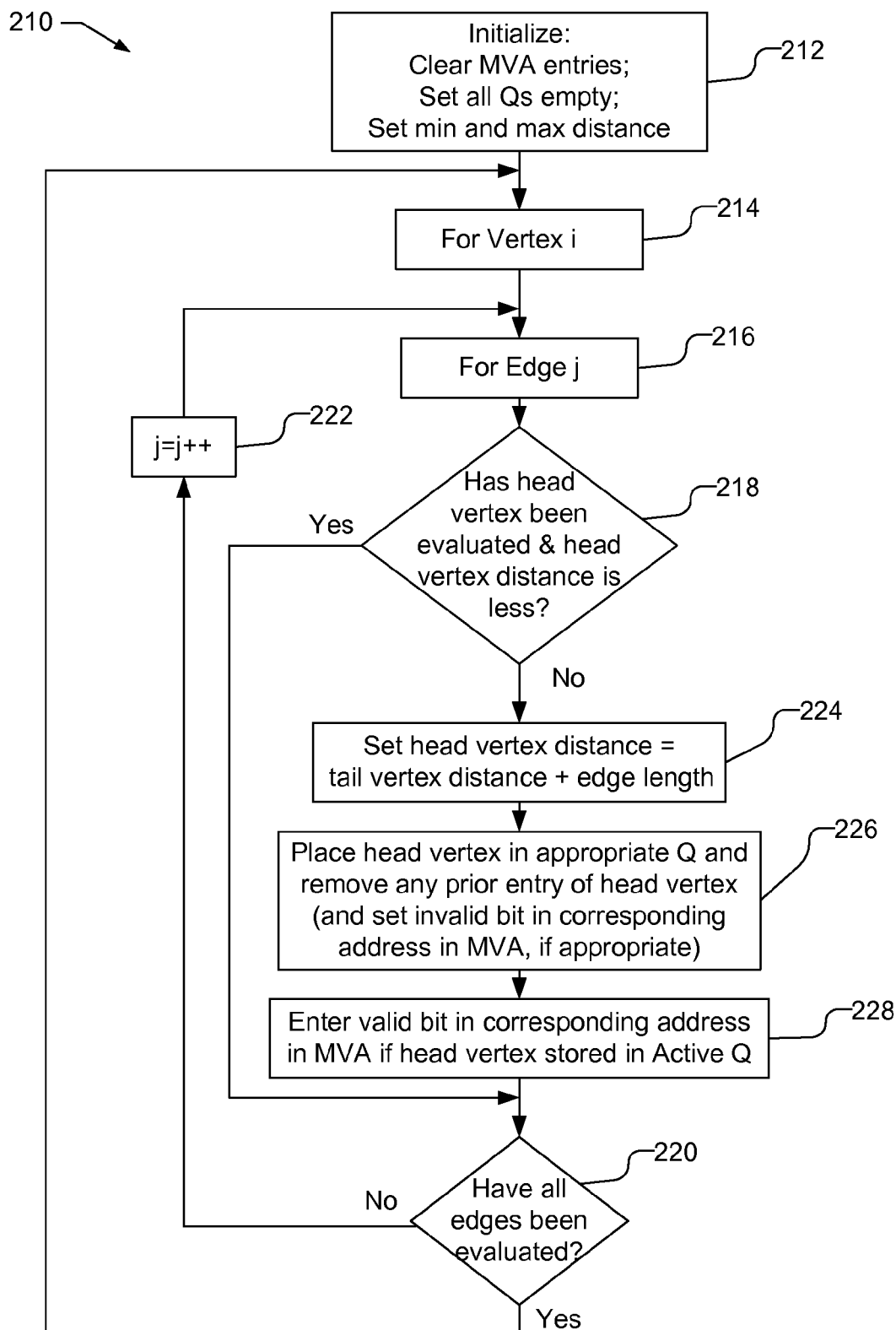

METHOD OF ACCELERATING THE SHORTEST PATH PROBLEM

CROSS-REFERENCE TO RELATED APPLICATION

This application is a divisional of U.S. patent application Ser. No. 10/404,970, filed Mar. 31, 2003, entitled "Accelerating The Shortest Path Problem", which is incorporated by reference in its entirety, including the CD-R attached as Appendix A.

CROSS-REFERENCE TO COMPUTER PROGRAM LISTING APPENDIX

Appendix A contains the following file in one CD-R (of which two identical copies are attached thereto), and is part of the present disclosure and is incorporated by reference herein in its entirety.
Volume in drive D is 030331_1128
Volume Serial Number is A13E-FF3F Directory of D:\

| 03/28/2003 09:01a | 19,856 DJKSCODE.TXT |
|---|---|
| 1 File(s) | 19,856 bytes |
| 0 Dir(s) | 0 bytes free |

The file of Appendix A form source code of computer programs written in C for an illustrative embodiment of the present invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to successively finding the highest-priority element in a database, and in particular to accelerating the search for the shortest path between multiple nodes.

BACKGROUND

The shortest-path problem is an important problem in graph theory because it has multiple practical applications in areas such as communications, transportation, and electronics. Well-known variants of the shortest-path problem include the all-pairs shortest-path problem and the single-source shortest-path problem. The present disclosure is primarily concerned with the single-source shortest-path problem, but may be used in conjunction with the all-pairs shortest-path problem if desired.

When solving the single-source shortest-path problem, the objective is to find the shortest path from a single source vertex to all other vertices in the graph. More specifically, we assume a directed multigraph $G=<V, E>$, where V is a set of n vertices, $\{v_1, v_2, \ldots, v_n\}$, E is a set of a edges, $\{e_1, e_2, \ldots, e_a\}$, an edge connects a pair of vertices, and a non-negative length, $\{l_1, l_2, \ldots, l_a\}$, is assigned to each edge. Then, if $v_1$ is selected as the source vertex, the problem is to find the shortest path from $v_1$ to $v_i$ for i=2 to n, where a path is a set of edges and the length of a path is the sum of the length of each edge comprising the path.

By way of example, FIG. 1 illustrates a directed graph having a number of vertices {v0, v1, v2, v3, ... v9}, sometimes referred to herein as nodes. Vertex v0 will be considered the source vertex. The graph shows a number of edges that connect pairs of the vertices and each edge includes a length, sometimes referred to herein as distance. Sometimes the edges are referred to herein as paths and the length of the edges is sometimes referred to as distance. Referring to FIG. 1, by way of example, the edges between source vertex v0 and vertices v1 and v2 both have a length 1, while the edge between vertices v1 and v7 has a length 5, and the edge between vertices v2 and v7 has a length 6. Thus, the shortest path length from source vertex v0 to vertex v7 is through vertex v1 and has a path length of 6. While other paths between source vertex v0 and vertex v7 are possible, e.g., through vertices v4, v5, and v1, as can be seen from FIG. 1, the sum of the edges in the other paths is greater than 6. As is well understood in the art, the length of an edge may represent, e.g., the physical separation between vertices, the cost, or speed of communication over a link between vertices or other similar type of attributes.

Dijkstra's process is a well-known solution to the single-source shortest-path problem that has been widely implemented. One particularly significant application of Dijkstra's process has been in conjunction with link-state routing protocols, such as the Open Shortest Path First (OSPF) routing protocol, defined by the Internet Engineering Task Force (IETF) in RFC 2328, and the Open System Interconnection (OSI) Integrated System-Integrated System (IS-IS) routing protocol defined by the International Standards Organization (ISO). In the routing protocol application, each router runs Dijkstra's process on a graph representing the network topology. Each router uses the vertex representing itself as the source vertex. The result is a set of shortest paths to all other routers in the network. The shortest paths are then used to build the routing database that is utilized to forward packets to the appropriate destination.

For large graphs, Dijkstra's process can be computationally intensive. Naturally, the time required to solve the shortest-path problem is important in many applications. As an example, in the routing protocol application, the shortest paths need to be recomputed when the network topology changes, such as when there is failure of communication links or communication equipment. In this case, the time required to solve the shortest-path problem can be a significant component of the time required to restore network stability. Furthermore, efficient solution of the shortest-path problem is becoming increasing important with the advent of constraint-based routing, which can require multiple iterations of the shortest-path process to build a routing database that conforms to the desired constraints.

Thus, what is needed is a shortest path search system and method that increases efficiency relative to the conventional Dijkstra's process, thereby reducing the amount of time to calculate a solution.

SUMMARY

In accordance with an embodiment of the present invention, the solution to the shortest path between a source node and multiple destination nodes is accelerated by grouping nodes based on distance from the source node and using a corresponding set of memory locations that indicate when a group includes one or more nodes. The next shortest distance node can be efficiently retrieved using the memory locations to search for the group that includes one or more nodes and that represents the shortest distance from the source node. Moreover, nodes may be grouped into additional groupings that do not correspond to the set of memory locations, when the distance from the source node to node exceeds the range of memory locations. The present invention may be applied generally to successively finding the highest-priority, e.g., lowest valued, element in a database.

In one embodiment, an apparatus includes a set of memory locations and a plurality of groups, each group comprising zero or more nodes, each group being associated with a memory location, the memory location containing a valid value if the group contains one or more nodes. The apparatus may additionally include a lookup circuit for finding a valid value in the set of memory locations at the highest-priority of the set of memory locations. In one particular embodiment, the set of memory location is a bit map and the valid value is a bit that is set. Further, the highest priority may correspond to the smallest address.

In another embodiment of the present invention, a method includes grouping nodes into a plurality of groups based on an attribute and initializing a set of memory locations, which contains one location for each group, by setting at least one bit in a memory location if the corresponding group contains at least one node. The method may include selecting a group with the attribute with the highest priority and having at least one node using the set of memory locations; and supplying a node from the selected group, wherein supplying comprises retrieving a node from the selected group and deleting the node from the selected group. In one embodiment, the attribute is based on the total distance of the shortest path from a source node to a node and the highest priority is, e.g., the shortest distance. Multiple groupings of nodes may be used, where nodes are grouped into a first set of groups when the nodes have an attribute that is within a range, which may correspond to the range of memory locations; and nodes are grouped into a second set of groups when the nodes have an attribute that is outside the range.

Another embodiment of the present invention includes a method of finding the shortest path between a source node and multiple destination nodes. The method includes evaluating nodes that neighbor a first node based on the distance of the neighboring nodes from the source node and grouping the neighboring nodes into a plurality of groups based on the distance from the source node to the neighboring node. The method may include initializing a set of memory locations, which contains one location for each group, by setting at least one bit in a memory location if the corresponding group contains at least one node; selecting a group having at least one node, the group representing the shortest distance from the source node; and retrieving the next node from the selected group and deleting the node from the selected group. The act of evaluating, grouping, and initializing nodes may be repeated using the next node as the first node.

BRIEF DESCRIPTION OF THE DRAWINGS

FIGS. 7A, 7B, and 7C are detailed flow charts of the process shown in FIG. 6.

DETAILED DESCRIPTION

Solving the shortest-path problem requires finding a shortest path to each of the other n−1 vertices in the graph, where each edge in the graph must be examined to do so. Accordingly, optimal performance is in $O(n+a)$, where a represents the number of edges. For connected graphs, where $a \geq n-1$, optimal performance is in $O(a)$. Well-known implementations of Dijkstra's process do not perform optimally. The reason is that at each iteration of the process, a vertex with minimum length from the source must be selected from a set of candidate vertices. Conventionally Dijkstra's process uses a linear search or min-heap to select the next minimum-length vertex. When a straightforward linear search is used, the performance of Dijkstra's process is in $O(n^2+a)$. If a min-heap is used to select the next vertex, the performance of the process is in $O(a \log n)$ (when $a \geq n-1$). Therefore, the linear search may be preferable if the graph is dense, while the min-heap may perform better when the graph is sparse. Nevertheless, the Dijkstra's process using the linear search or min-heap to select the next vertex with minimum length from the source does not perform optimally.

According to an embodiment of the present invention, the solution of the shortest-path problem is accelerated by avoiding the use of a linear search or min-heap and instead searching for the next vertex with minimum length from the source simultaneously or near simultaneously. In one embodiment, a hardware unit, referred to herein as Minimum Value Accelerator (MVA), is used to search for the next minimum length vertex.

Figure 2:
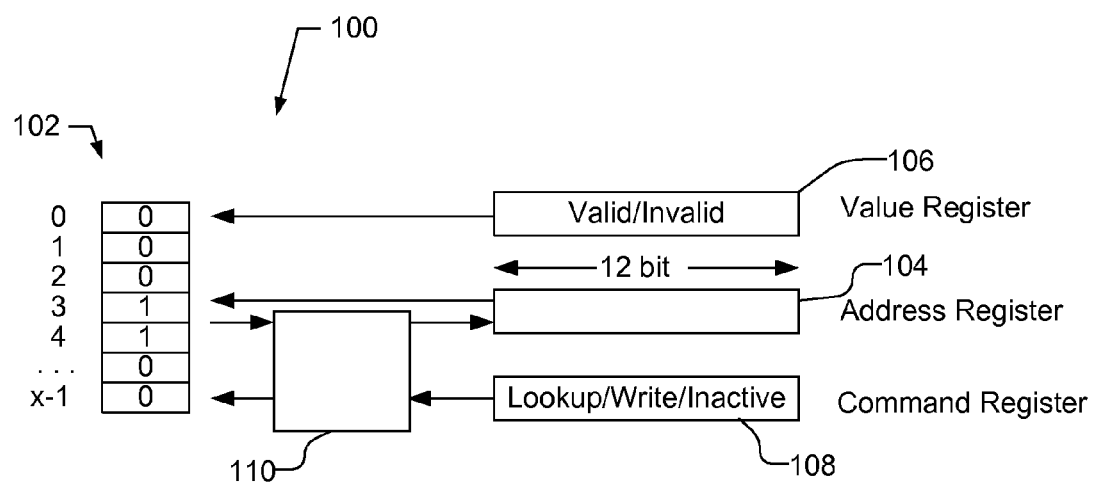
FIG. 2 illustrates schematically an embodiment of the Minimum Value Accelerator in accordance with an embodiment of the present invention.

FIG. 2 schematically illustrates one embodiment of the Minimum Value Accelerator (MVA) 100, which includes a set of memory locations, such as a bit map, referred to herein as memory array 102, and a lookup circuit 110. The memory array 102 has x locations each consisting of, e.g., one bit. Each location in memory array 102 represents a particular distance from the source vertex, e.g., entry 1 represents a distance of 1, entry 2 represents a distance of 2, etc. . . . . A distance may represent, e.g., the physical separation between vertices, the cost, or speed of communication over a link between vertices or other similar type of attributes, which is understood to those skilled in the art. By way of example, there may be 4096 memory locations in memory array 102, and thus, a distance of 4095 may be represented with MVA 100. Of course, MVA 100 may have additional or fewer memory locations, and therefore additional or fewer distances may be represented by MVA 100. The one bit in each memory location in the memory array 102 may be written with either a 1 or a 0, where, e.g., a 1 indicates that the location is valid and a 0 indicates that the location is invalid. Thus, the one bit at each memory location is sometimes referred to herein as the valid bit.

As shown in FIG. 2, the MVA 100 is interfaced by multiple registers, including an address register 104, a value register 106, and a command register 108. The command register 108 indicates whether a value is to be written into memory array 102, looked up from memory array 102, or if neither should occur, i.e., inactive. During a write command, value register 106 provides the desired value, i.e., valid or invalid (1 or 0), to be written into the memory array 102, while address register 104 provides the memory location address, which may be, e.g., 12 bits.

During a lookup command, lookup circuit 110 searches the memory array 102 for the lowest valid memory address, i.e., with the valid bit set to 1. Lookup circuit 110 provides the address of the lowest valid memory address to address register 104.

Figure 3:
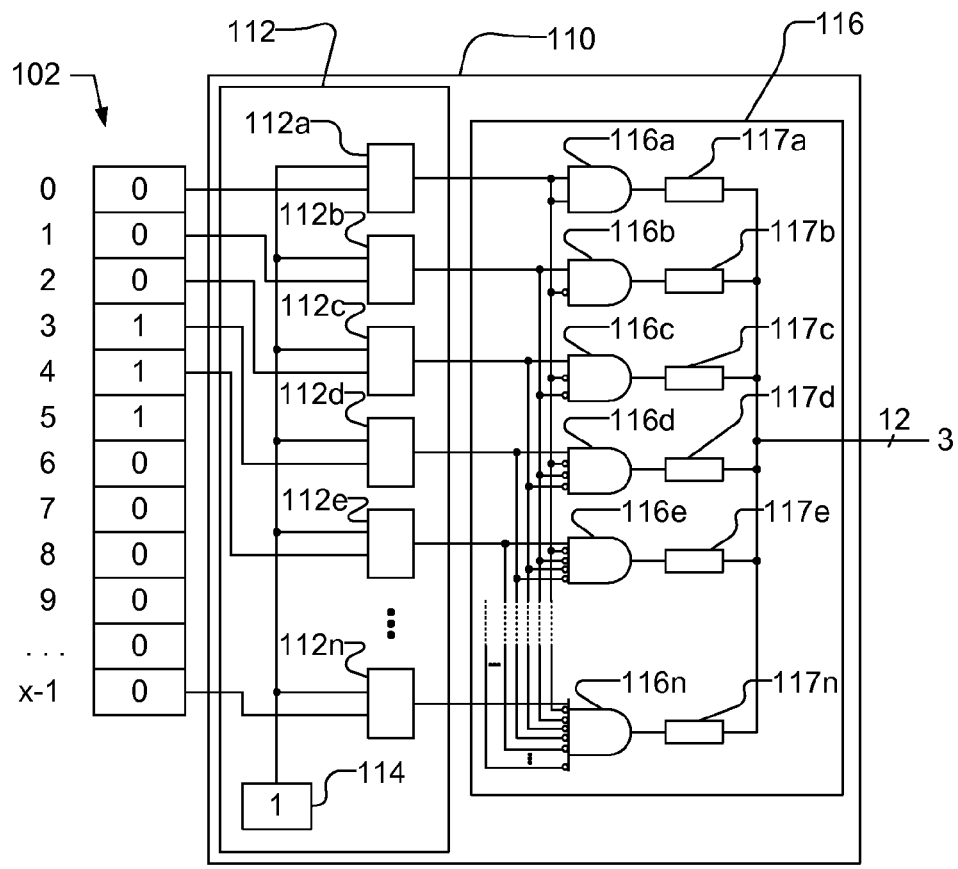
FIG. 3 shows a schematic view of one implementation of a lookup circuit used in the Minimum Value Accelerator.

FIG. 3 shows a schematic view of one implementation of lookup circuit 110. Lookup circuit 110 simultaneously analyzes each location in memory array 102 and produces the address of the lowest valid memory location. As shown in FIG. 3, lookup circuit 110 may include a comparator circuit 112 that includes a number of comparators 112a-112n, each of which is associated with an address in the memory array 102. Comparators 112a-112n compare the content of their associated addresses in the memory array 102 with a valid bit, e.g., 1, stored in register 114. Thus, comparator circuit 112 provides output signals indicating which addresses in memory array 112 are valid.

An address identifier circuit 116 receives the output signals from comparator circuit 112 and determines which valid address is the lowest. Address identifier circuit 116 then produces that lowest valid address as an output signal, which is received by address register 104. Thus, where there are 4096 address locations in memory array 102, address identifier circuit 116 receives 4096 input signals from comparator circuit 112 and logically produces a 12 bit output signal that represents the address of the lowest valid address. By way of example, address identifier circuit 116 may include a number of AND logic gates 116a-116n that are coupled to respective comparators 112a-112n, such that the lowest AND logic gate that receives a high signal from comparators 112a-112n produces a high signal and the remaining AND logic gates produce a low signal. Registers 117a-117n, which are coupled to respective AND logic gates 116a-116n, store the address of the memory location to which they correspond. When an AND logic gate produces a high signal, the receiving register produces the stored address as an output signal. By way of example, as illustrated in FIG. 3, address 3 in memory array 102 is the lowest memory location that has a valid bit, and accordingly lookup circuit 110 produces an output signal identifying that address.

As is well within the abilities of those of ordinary skill in the art, the address identifier circuit 116 may be implemented using any desired circuitry to produce the first, i.e., lowest, address that contains a valid bit, as indicated by comparator circuit 112. It should be understood that FIG. 3 is merely one implementation of lookup circuit 110 and that many other implementations are possible that provide simultaneous or approximately simultaneous comparison of the valid memory locations in memory array. Moreover, it should be understood that lookup circuit 110 may be implemented in software if desired. A software implementation, however, may lose certain advantages of the hardware implementation, such as speed.

The address provided by the lookup circuit 110 is used as a pointer into an Active Queue Array. The Active Queue Array is a plurality of groups or entries where each entry is associated with a location in the MVA 100. For example, the Active Queue Array may contain x entries, i.e., the same number of entries as address locations in the MVA 100. The Active Queue Array is tightly coupled to the MVA 100. Initially, the MVA 100 and the Active Queue Array are used to represent candidate vertices whose current distance from the source vertex is in the range 0 to x−1. There is one entry in the Active Queue Array for each entry in the Minimum Value Accelerator 100. Each entry in the Active Queue Array contains the anchor for a queue of candidate vertex data structures. When one or more candidate vertices exist at a particular distance from the source distance, the valid bit is set in the associated address in the MVA 100. Thus, if a candidate vertex with distance i, i<x, is evaluated, the memory array 102 address i is set to valid, and the data structure representing the candidate vertex is inserted in the queue anchored at entry i of the Active Queue Array.

Figure 4:
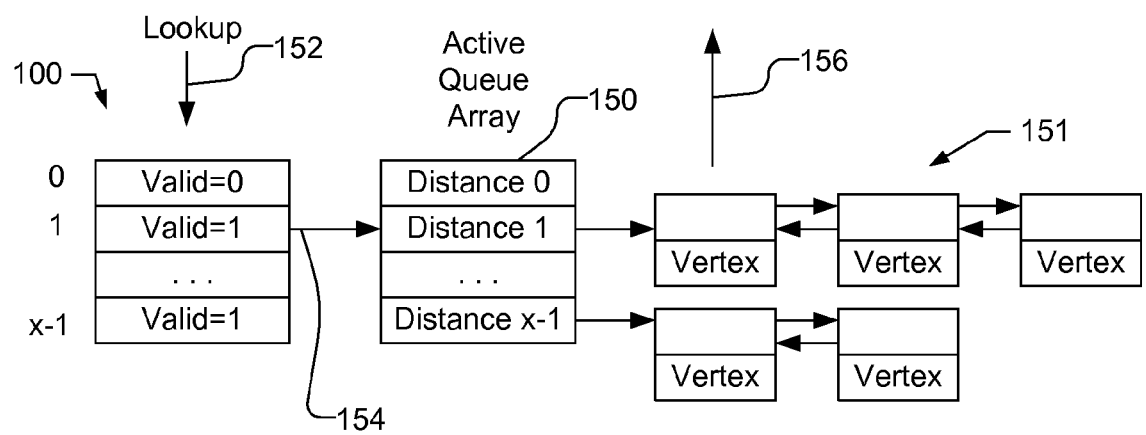
FIG. 4 illustrates a lookup operation of the Minimum Value Accelerator with retrieval of the next vertex from Active Queue Array.

FIG. 4 schematically illustrates a lookup operation of the MVA 100 with retrieval of the next vertex from Active Queue Array 150. As indicated by arrow 152, a lookup operation is performed on MVA 100 to find the lowest valid address. The resulting address represents the shortest current distance from the source vertex to any other vertex. The lookup result is used directly as an index into the Active Queue Array 150, as indicated by arrow 154. Each entry in the Active Queue Array contains the anchor for a queue of candidate vertex data structures, e.g., queue 151 of vertex data structures. Each location in the Active Queue Array may contain more than one candidate vertex, but each candidate vertex in a particular location has the same distance from the source vertex. Thus, all of the data structures in a given queue anchored in the Active Queue Array represent candidate vertices with the same current distance from the source. The next minimum-distance vertex to be used by the shortest-path process is removed from the head of the queue anchored at entry of the Active Queue Array as indicated by arrow 156.

Because Active Queue Array 150 has the same number of entries as address locations in MVA 100, if the distance between a candidate vertex and the source exceeds the number of entries, the candidate vertex cannot be stored in the Active Queue Array 150. Accordingly, in one embodiment of the present invention, more than one queue array may be used to represent candidate vertices and their distances from the source vertex. For example, in addition to the Active Queue Array 150, which represents distances up to the number of entries in the MVA 100, a Candidate Queue Array may also be used.

Candidate Queue Array may include any number of entries y, e.g., 16,384. Each entry in the Candidate Queue Array may be associated with a specific range of distances. Thus, for example, Candidate Queue 0 is used for vertices with distances in the range [0 . . . xz−1], while Candidate Queue 1 is used for vertices with distances in the range [xz . . . 2xz−1]. This pattern continues with each Candidate Queue being used for vertices whose distances are within xz of each other, where z represent a scaling factor that may be used to increase the number of distances that are stored in the y entries of the Candidate Queue Array.

Figure 5:
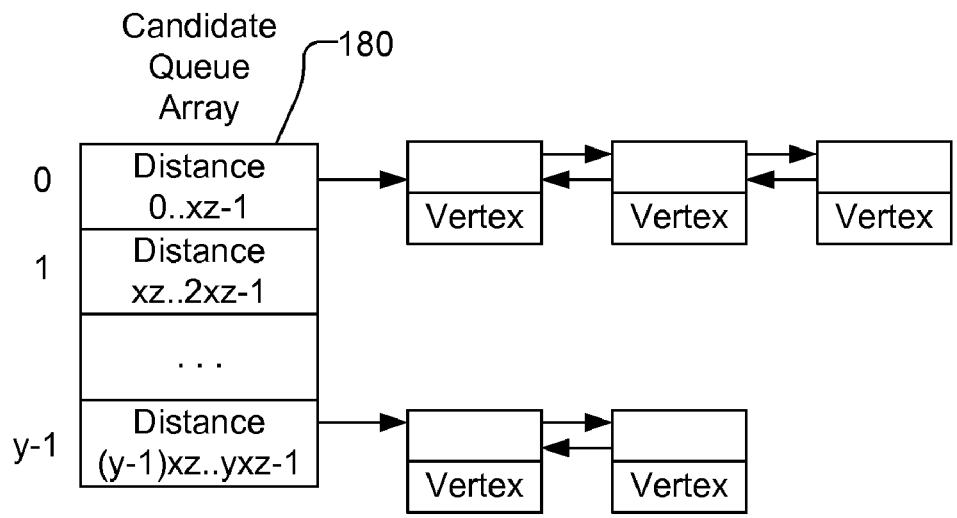
FIG. 5 schematically illustrates a Candidate Queue Array and associated data structures.

FIG. 5 schematically illustrates a Candidate Queue Array 180 and associated data structures. The Candidate Queue Array is used for candidate vertices whose distance from the source is greater than the range currently supported by the Minimum Value Accelerator 100. For example, if the Minimum Value Accelerator 100 is currently supporting vertices with distances in the range 0 to x−1, then a candidate vertex with distance greater than x−1 would be inserted in the appropriate Candidate Queue for subsequent processing.

When the MVA 100 lookup operation does not return a valid address, then all of the remaining candidate vertices have distances greater than the range currently supported by the MVA 100. When this occurs, the range of distance values supported by the MVA 100 is increased by x. Vertex entries in this new range are then removed from Candidate Queue Array 180 and inserted into the Active Queue Array in an entry associated with the vertex's distance from the source. This procedure is repeated until all vertices with distances less than xyz have been processed.

Vertices with distances greater than xyz−1 are stored in an Overflow Data Structure and are processed after all other vertices stored in the Active Queue Array and Candidate Queue Array have been processed. Vertices in the Overflow Data Structure are processed using a conventional implementation of Dijkstra's process, e.g., using a linear search or min-heap, which is well known in the art.

It should be understood that both the Active Queue Array and the Candidate Queue Array and Overflow Data Structure may be implemented with conventional Random Access Memory (RAM) and do no require special hardware support.

Figure 6:
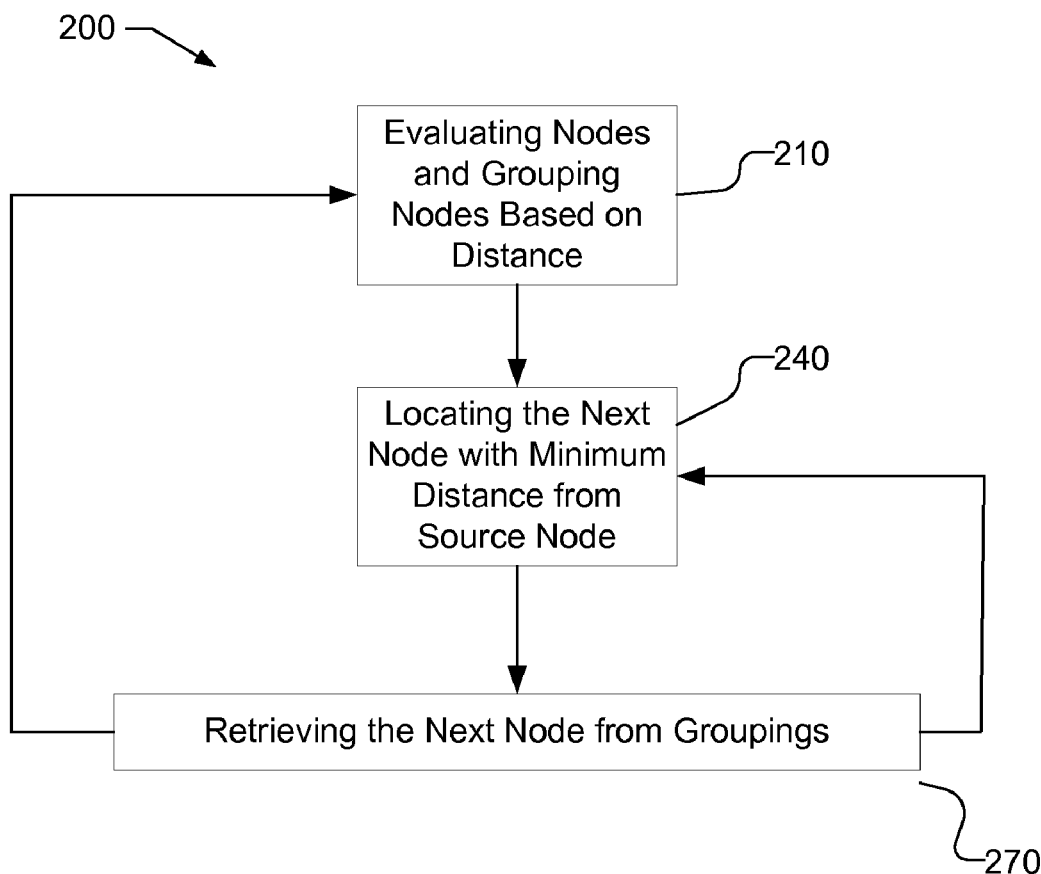
FIG. 6 is a flow chart of the general process of determining the shortest path between a single source vertex and multiple vertices that may be implemented in accordance with an embodiment of the present invention.

FIG. 6 is a flow chart 200 of the general process of determining the shortest path between a single source vertex and multiple vertices, which may be implemented using the MVA 100, Active Queue Array 150 and Candidate Queue Array 180, in accordance with an embodiment of the present invention. The method includes evaluating nodes and grouping the nodes, e.g., into the Active Queue Array or Candidate Queue Array, based on the distance of the nodes from the source in step 210. The next node with a minimum distance from the source node is then located using the MVA 100 in step 240. Using the address provided by the MVA 100, the next node is then retrieved from the groupings, i.e., the Active Queue Array, in step 270. The process then flows back to step 210 to evaluate the nodes that neighbor the next node retrieved in step 270. If there are no more nodes in the Active Queue Array, the entries in the Candidate Queue Array are moved into the Active Queue Array and the process flows back to step 240 to locate the next node with the minimum distance from the source vertex. If there are no entries in the Candidate Queue Array (or in the Overflow Data Structure), the process ends.

Figure 7B:
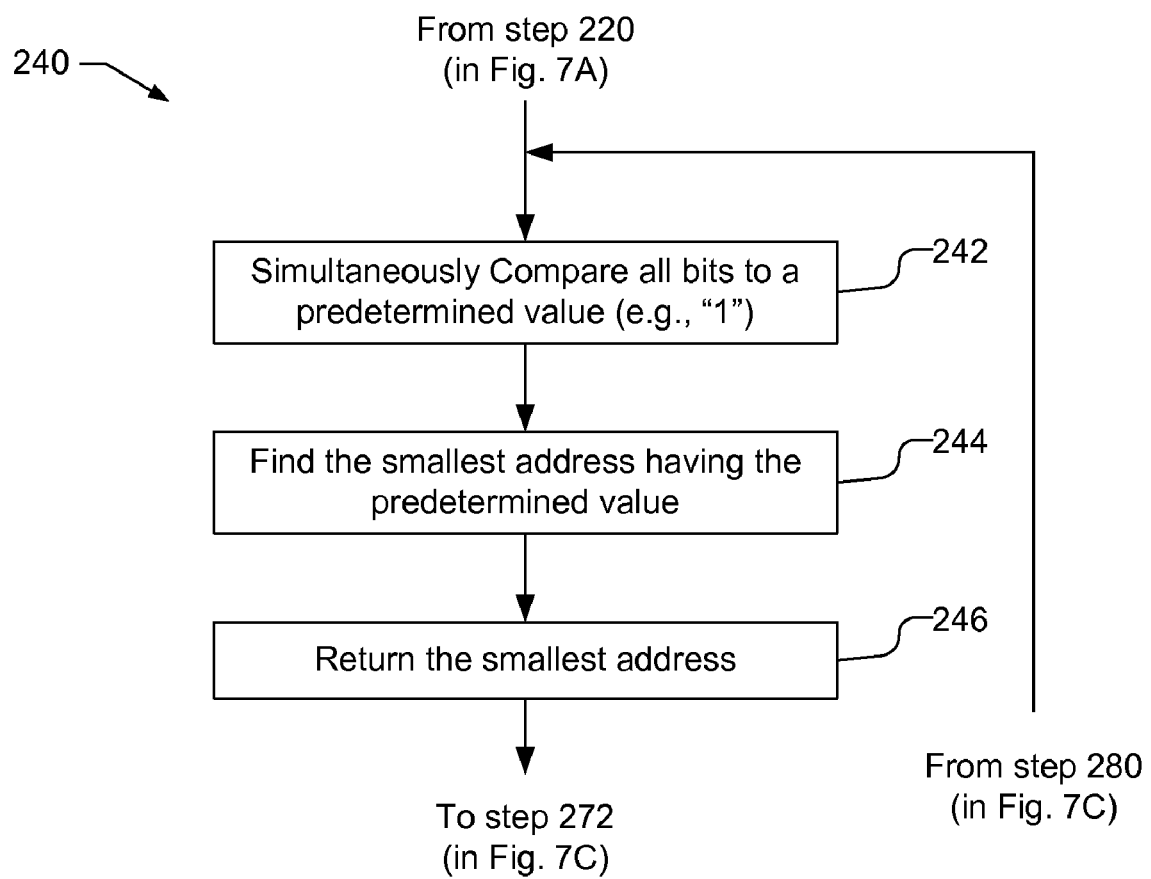
Figure 7C:
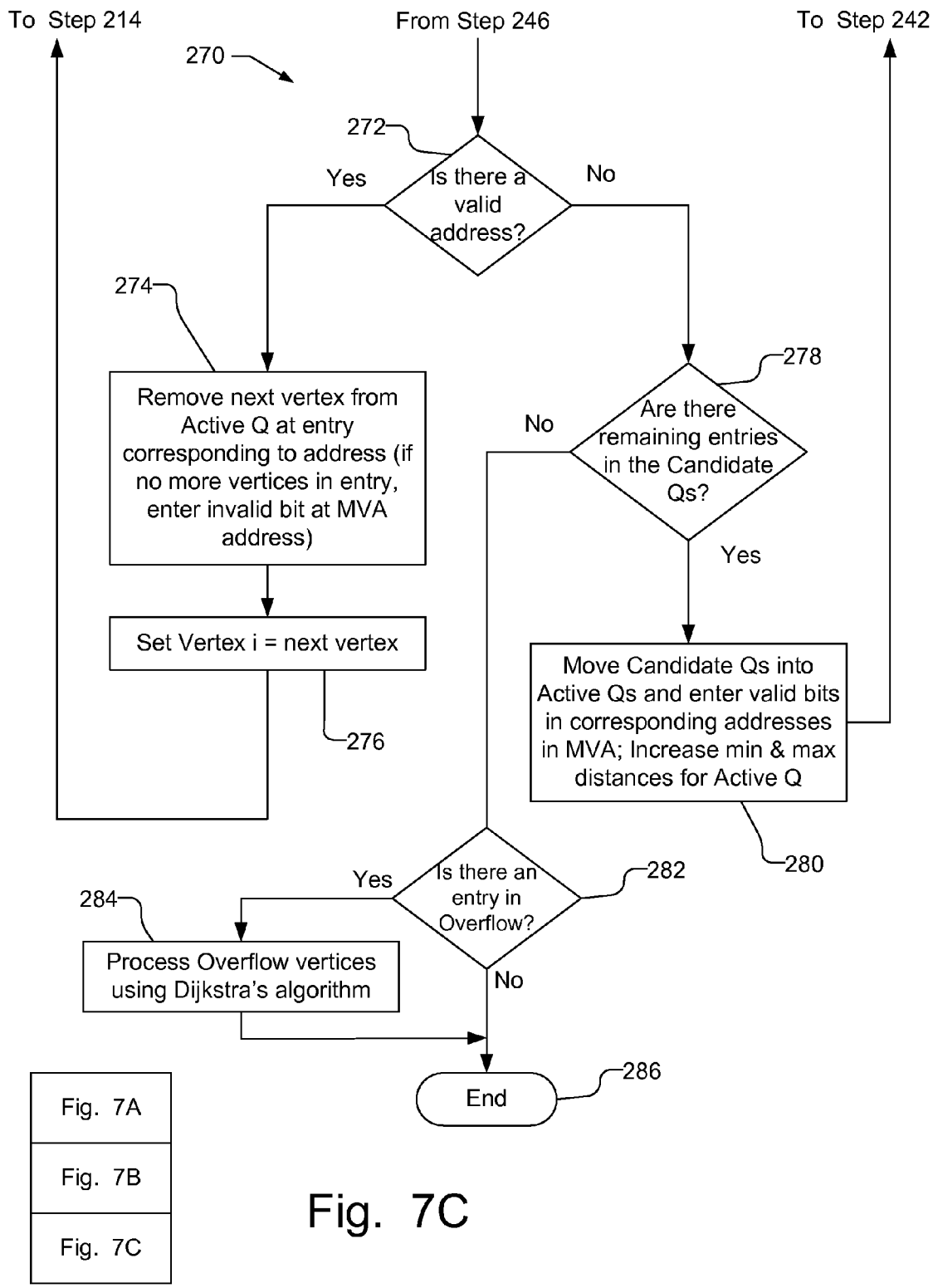

FIGS. 7A, 7B, and 7C are more detailed flow charts of the process steps shown in FIG. 6. For example, FIG. 7A is a flow chart of the process of evaluating nodes and grouping nodes based on distance (step 210 in FIG. 6). As shown in FIG. 7A, the process includes an initialization step 212 that clears the entries in the Minimum Value Accelerator 100 (i.e., all valid bits are set to 0), empties the Active Queue Array 150, Candidate Queue Array 180 and Overflow Data Structure, and sets the minimum and maximum distances represented by the Active Queue Array and Candidate Queue Array, e.g., [0 . . . x−1] and [0 . . . xyy−1], respectively.

The process evaluates each edge j (indicated by block 216) for a vertex i (indicated by block 214) starting with the source vertex and moving to the next shortest distance vertex as located by the MVA 100, as will be discussed below.

Figure 1:
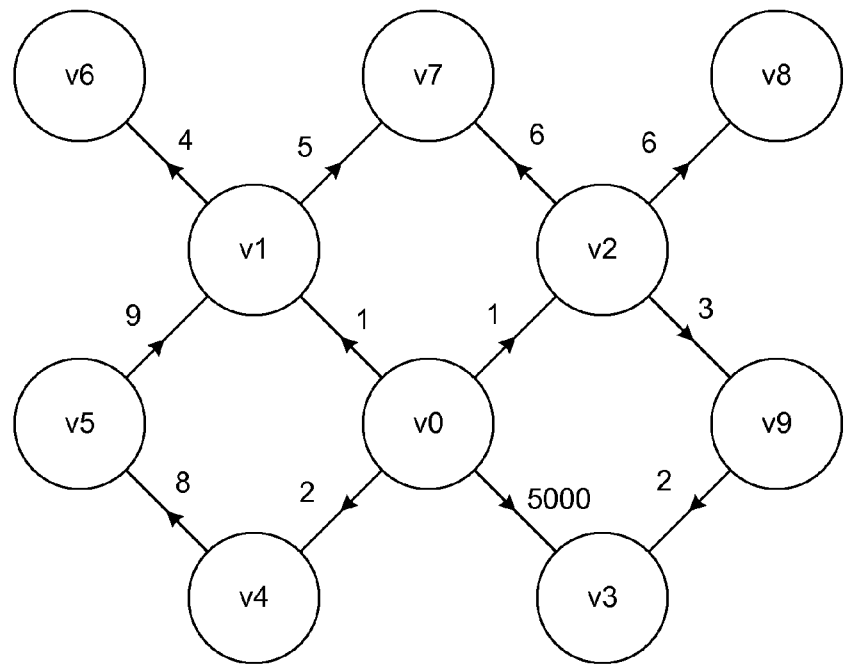
FIG. 1 illustrates an illustrative graph including a number of nodes.

It should be understood that in the following, the tail vertex refers to the vertex from which the edge emanates and the head vertex refers to the neighboring vertex, i.e., the vertex to which the edge extends. By way of example, referring to FIG. 1, if vertex i is vertex v1, and the edge between vertices v1 and v7 is being evaluated, vertex v1 is the tail vertex and vertex v7 is the head vertex. In addition, the distance of the tail vertex refers to the distance from the source vertex to the tail vertex, e.g., in the present example, the distance from source vertex v0 to the tail vertex v1 is 1. The distance of the head vertex refers to the distance from the source vertex to the head vertex, which is the tail vertex distance plus the length of the edge, e.g., in the present example, the distance from source vertex v0 to head vertex v7 via vertex v1 is 6.

At step 218, if the head vertex has already been evaluated and the previously determined head vertex distance is less than the length of the edge under evaluation plus the tail vertex distance, the process will go to the next edge if there are any additional edges, as indicated by steps 220 and 222.

Otherwise, in step 224 the head vertex distance is set to be the length of the edge plus the tail vertex distance. In step 226, the head vertex is then placed in the appropriate queue at the appropriate entry corresponding to the head vertex distance. In other words, if the head vertex distance is less than the maximum distance for the Active Queue Array, the head vertex will be stored in an entry in the Active Queue Array that corresponds with the head vertex distance. If, on the other hand, the head vertex distance is greater than the maximum distance for the Active Queue Array, but less than maximum distance for the Candidate Queue Array, the head vertex will be stored in the Candidate Queue Array. In one embodiment, the entry in the Candidate Queue Array for the head vertex is determined as floor(head vertex distance/(x*z)), where x is the number of addresses in the MVA 100, and z is a scaling factor, which may be, e.g., 1. By increasing z, the number of distances that may be entered into Candidate Queue Array is increased. If the head vertex distance is greater than the maximum distance for the Candidate Queue Array, the head vector is placed in the Overflow Data Structure.

In addition, if the head vertex had already been evaluated, the prior head vertex entry is removed from its previous queue entry in step 226 and, if appropriate, the corresponding location in the MVA 100 is set to invalid, e.g., if there are no more vertices stored in the previous queue entry. Thus, the head vertex is entered only in one queue which corresponds to the shortest distance from the source vertex. In step 228 the valid bit in the corresponding address in the MVA 100 is set if the head vertex is placed in the Active Candidate Queue. The next edge associated with the same tail vertex is then evaluated as indicated steps 220 and 222.

Once all the edges for vertex i (block 214) have been evaluated, the next candidate vertex with the minimum distance from the source vertex is located (step 240 in FIG. 6). FIG. 7B is a flow chart of the next vertex locating process of step 240 in FIG. 6. The next candidate vertex is located using the MVA 100, which is described above. As illustrated in FIG. 7B, in step 242 all bits in the MVA 100 are simultaneously compared to a predetermined value, e.g., 1, to find all valid addresses. The smallest address having that predetermined value is then found in step 244 and the smallest address is then returned in step 246.

With the address of the next vertex returned from the MVA 100, the next vertex is obtained and removed from the Active Queue Array (step 270 in FIG. 6). FIG. 7C is a flow chart of the subsequent step 270 in FIG. 6.

As shown in FIG. 7C, if the MVA 100 provides a valid address, i.e., an address in the Active Queue Array, the next vertex is removed from the Active Queue Array at the entry corresponding to that address, as indicated in steps 272 and 274. If there are no additional vertices in the entry that corresponds to the found address, an invalid bit is set at the corresponding address in the MVA 100. In step 276, the vertex i is then set to be the next vertex and the process flows back to the step 214 for edge evaluation, as discussed above.

If, on the other hand, there is no valid address in step 272, i.e., no entries in the Active Queue Array, the Candidate Queue Array is searched to determine if there are any entries (step 278). If there are entries in the Candidate Queue Array, the vertex data structures in the Candidate Queues are moved up to the appropriate Active Queues and the valid bits are set in the appropriate addresses in the MVA 100 (step 280). In addition, the minimum and maximum distances for the Active Queue Array and Candidate Queue Array are incremented (step 280). The process then flows to back to step 242 in FIG. 7B.

Figure 8:
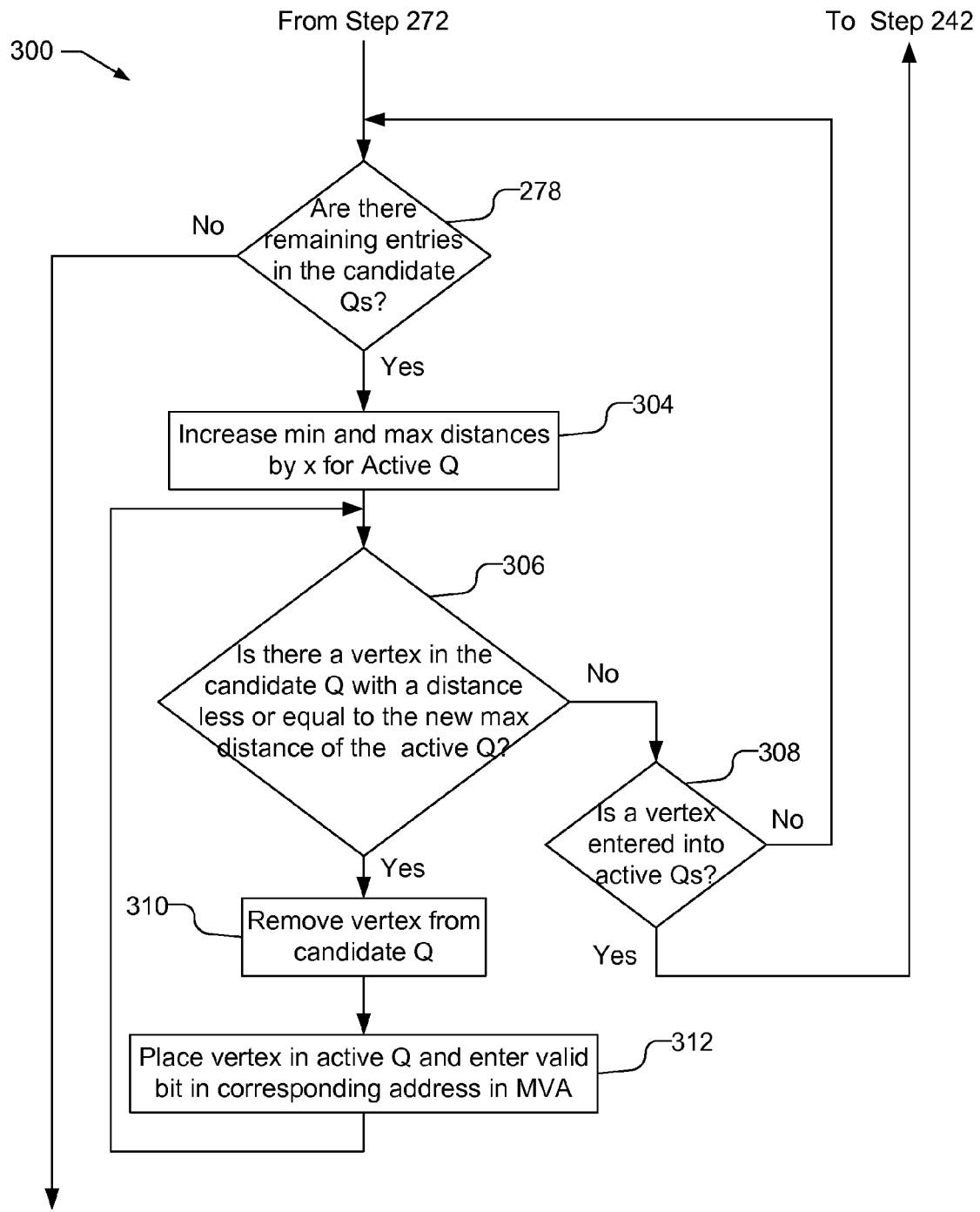
FIG. 8 is a detailed flow chart of part of the process shown in FIG. 7C.

FIG. 8 is a flow chart 300 that shows the process of determining if there are entries in the Candidate Queue Array (step 278) and moving the entries in the Candidate Queue Array into the Active Queue Array (step 280) in more detail. As shown in FIG. 8, if there are no remaining entries in the Candidate Queue Array, the process flows to step 282 in FIG. 7C.

If, however, there are remaining entries in the Candidate Queue Array, the process flows to step 304 and the minimum and maximum distances of the Active Queue Array is increased by x, i.e., the number of locations in array 102. In step 306 it is determined if there is a vertex in the Candidate Queue Array that is less than or equal to the new maximum distance of the Active Queue Array. If there is a vertex that is less than or equal to the new maximum distance, the vertex is removed from the Candidate Queue Array (step 310), inserted into the appropriate entry in the Active Queue Array and the valid bit in the corresponding address in the MVA 100 is set (step 312). The process then flows back to step 306 to determine if there is another vertex in the Candidate Queue Array that is less than or equal to the new maximum distance in the Active Queue Array. In this manner, all vertices in the Candidate Queue Array that are less than or equal to the new maximum distance in the Active Queue Array are moved to the Candidate Queue Array and a valid bit in the corresponding addresses in the MVA is set.

If, in step 306, it is determined that there is no vertex in the Candidate Queue Array that is less than or equal to the new maximum distance of the Active Queue Array, the process flows to step 308. In step 308, it is determined if a vertex has been entered into Active Queue Array. If so, the process flows back to step 242 (in FIG. 7B) to locate the next minimum distance vertex. If there are no entries in the Active Queue Array, the process flows back to step 278, as shown in FIG. 8. In this manner, all y entries in the Candidate Queue Array may be searched for vertices, and if found they are moved to the Active Queue Array for evaluation.

If there are no remaining entries in the Candidate Queue Array from step 278, the Overflow Data Structure is searched in step 282 (FIG. 7C) to determine if there are any entries. If there are vertices in the Overflow Data Structure, these vertices may be processed using a conventional implementation of Dijkstra's process, such as using a linear search or min-heap (step 284). Otherwise, the process ends (block 286).

It should be understood that the present invention may be implemented in a computer implementing a computer program such as that disclosed in the attached Appendix A, which is incorporated herein by reference. Appendix A includes code written in C and is an illustrative embodiment of the present invention. The code in Appendix A assumes that the graph is represented with adjacency list data structures. The source code in the attached appendix can be used with an ANSI compliant C compiler, such as a GCC compiler, version 2.95.3 available on the Internet. The software generated by compiling the above-described files can be executed in a Sun workstation running the operating system Solaris, version 2.8.

Figure 9:
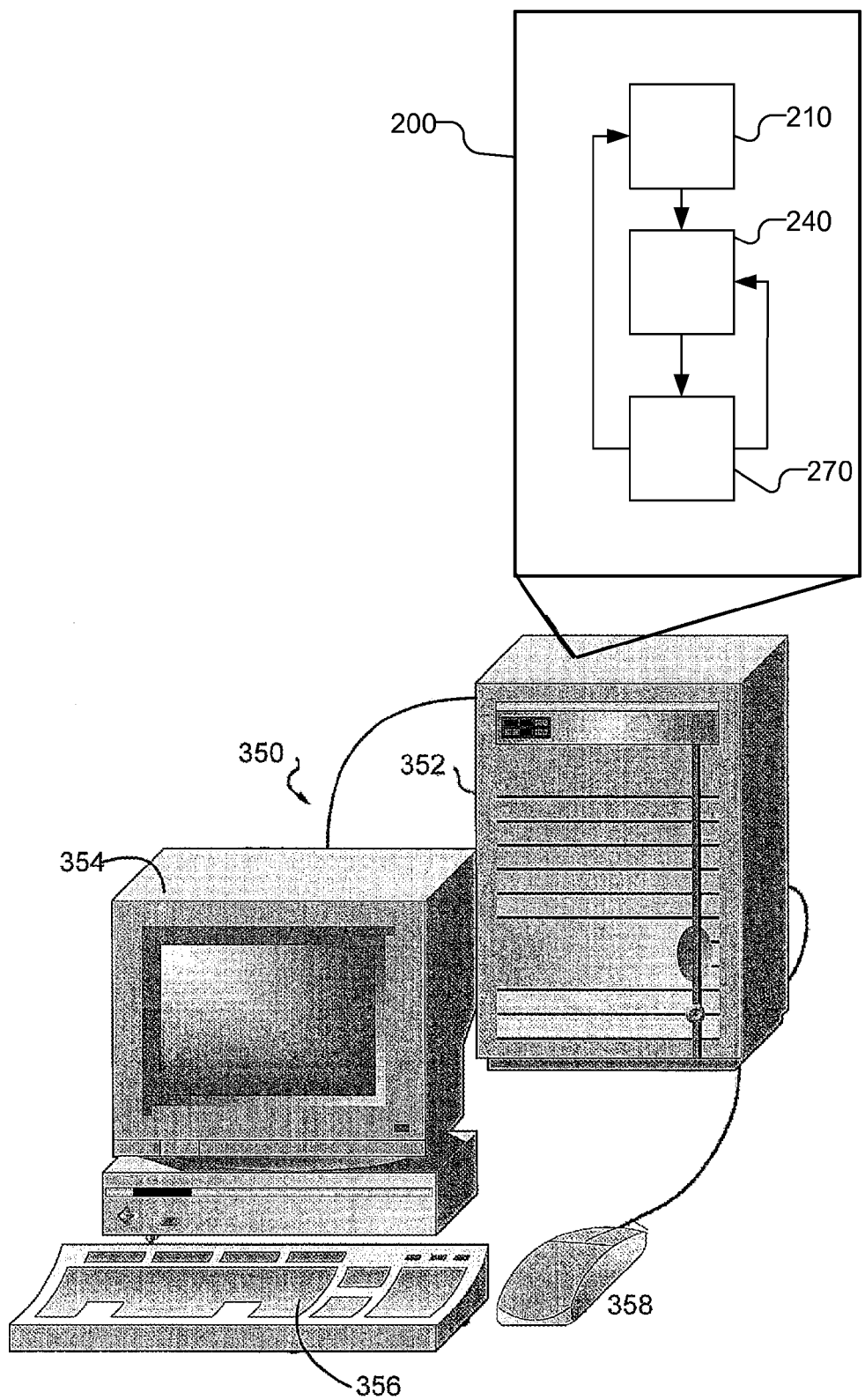
FIG. 9 illustrates a computer that may be used to implement the present invention.

FIG. 9 illustrates a computer 350, which may be, e.g., a 64-bit computer (such as a Solaris workstation), that may include a CPU illustrated as tower 352, a monitor 354, keyboard 356 and mouse 358, which may implement the present invention, as illustrated by flow chart 200. It should be understood that the MVA 100 may be a hardware unit that coupled to the CPU.

Based on the above implementation, the lookup operation of the MVA 100 is performed once for each of n−1 vertices. When one of the Active Queues contains a vertex data structure, the procedure executes in constant time. When all the Active Queues are empty, the function may move up to xz vertex data structures from a Candidate Queue to the appropriate Active Queues. However, a particular vertex is only moved from a Candidate Queue to an Active Queue one time, and may be examined a maximum of z times to determine if the vertex should be moved. Thus, if the length of all the shortest paths is less than xyz, then the time complexity of the invocations of the n−1 operations for the MVA lookup is in O(zn).

In addition, in the implementation presented above, each of the a edges in the graph are evaluated once. When the Overflow Data Structure is not accessed, the procedure executes in constant time. Thus, if the length of all the shortest paths is less than xyz, then the time complexity of the invocation of the a edge evaluations is in O(a).

Combining the above results, when the length of all the shortest paths in the graph is less than xyz, the overall performance is in O(zn+a). Moreover, if it is assumed that z<<n and that the graph is connected (i.e., a≧n), then the performance of the process is in O(a), which is both asymptotically optimal and better than any other known solution.

With current technology, some conservative, cost-effective values for the parameters x, y, and z might be x=4096, y=16, 384, and z=1. Use of these parameters enables an optimal solution for shortest-path lengths less than 67,108,864.

Furthermore, if some shortest-path lengths do exceed the maximum for an optimal solution, the present invention will accelerate the solution for all vertices whose shortest-path length is less than xyz, and will not negatively impact the asymptotic performance of the solution for vertices with shortest-path lengths that exceed xyz.

Although the present invention is illustrated in connection with specific embodiments for instructional purposes, the present invention is not limited thereto. Various adaptations and modifications may be made without departing from the scope of the invention. For example, it should be understood that the mechanisms described herein can be generalized to apply to the more fundamental problem of successively finding the highest-priority, e.g., minimum-valued, element in a database. The generalization is straightforward when the value of database elements cannot be increased, as is the case with the shortest-path problem. This mechanism can also be enhanced to handle increases in database element values. Moreover, where the value of database elements can be either increased or decreased, the mechanisms described in the present disclosure can be used to achieve significant improvements of the average case performance. Further, it should be understood that while process steps are described in a particular order, the order of the steps may be altered if desired. Therefore, the spirit and scope of the appended claims should not be limited to the foregoing description.

What is claimed is:

1. A computer implemented method of finding the shortest path between a source node and multiple destination nodes, said method comprising:

evaluating with a computer nodes tat neighbor a first node based on the distance from the source node to the neighboring nodes;

grouping with the computer the neighboring nodes into a plurality of groups based on the distance from the source node to the neighboring nodes;

initializing with the computer a set of memory locations, which contains one location for each group, by setting at least one bit in a memory location if the corresponding group contains at least one node;

selecting with the computer a group having at least one node, said group representing the shortest distance from the source node;

retrieving with the computer the next node from said selected group and deleting said node from said selected group.

2. The method of claim 1, further comprising:

repeating the acts of evaluating, grouping, and initializing nodes using said next node as said first node.

3. The method of claim 1, wherein grouping with the computer the neighboring nodes into a plurality of groups based on the distance from the source node to the neighboring nodes comprises:

storing a neighboring node in a first set of plurality of groups if the distance from said source node to said neighboring node is within a range;

storing a neighboring node in a second set of plurality of groups if the distance from said source node to said neighboring node is greater than said range;

wherein said set of memory locations contains one location for each group in said first set of plurality of groups.

4. The method of claim 1, wherein said set of memory locations represents said range, said range being based on the number of locations in said set of memory locations.

5. The method of claim 4, further comprising:

increasing the range represented by said set of memory locations; and moving nodes from said second set of plurality of groups to said first set of plurality of groups when said nodes have an attribute that is within said increased range.

6. The method of claim 5, wherein said increasing the range and moving nodes is performed when there are no nodes in said first set of plurality of groups.

* * * * *